US008144611B2

(12) United States Patent
Agarwal et al.

(10) Patent No.: US 8,144,611 B2
(45) Date of Patent: Mar. 27, 2012

(54) NETWORK COORDINATE SYSTEMS USING IP INFORMATION

(75) Inventors: Sharad Agarwal, Seattle, WA (US); Jacob R. Lorch, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 325 days.

(21) Appl. No.: 12/368,844

(22) Filed: Feb. 10, 2009

(65) Prior Publication Data
US 2010/0202298 A1    Aug. 12, 2010

(51) Int. Cl.
*H04L 12/26*    (2006.01)
(52) U.S. Cl. .................. 370/252; 370/255; 709/224
(58) Field of Classification Search .......... 370/241–258; 709/223–226, 24
See application file for complete search history.

(56) References Cited

U.S. PATENT DOCUMENTS

| | | | |
|---|---|---|---|
| 5,115,433 A | 5/1992 | Baran | |
| 7,174,382 B2 | 2/2007 | Ramanathan et al. | |
| 7,778,165 B2 * | 8/2010 | Madhyastha et al. | 370/254 |
| 7,843,822 B1 * | 11/2010 | Paul et al. | 370/254 |
| 2003/0007454 A1 * | 1/2003 | Shorey | 370/252 |
| 2003/0177183 A1 * | 9/2003 | Cabrera et al. | 709/224 |
| 2006/0209717 A1 * | 9/2006 | Sharma et al. | 370/254 |
| 2007/0050497 A1 * | 3/2007 | Haley et al. | 709/224 |
| 2007/0299794 A1 | 12/2007 | El-Damhougy | |
| 2008/0304421 A1 * | 12/2008 | Ramasubramanian et al. | 370/251 |
| 2009/0144411 A1 * | 6/2009 | Winkler et al. | 709/224 |

OTHER PUBLICATIONS

Chan-Tin et al., "Accurate and Provably Secure Latency Estimation with Treeple", NDSS, 2011, all pages.*

Gummadi et al., "Reduced State Routing in the Internet", HotNets, 2004, all pages.*

Li-Wei Lehman, et al., A Decentralized Network Coordinate System for Robust Internet Distance http://ieeexplore.ieee.org/stamp/stamp.jsp?arnumber=1611675&isnumber=33849 Last accessed on Nov. 18, 2008, 7 pages.

Puneet Sharma, et al., Estimating Network Proximity and Latency http://www.hpl.hp.com/personal/Sung-Ju_Lee/abstracts/papers/ccr2006.pdf Last accessed on Nov. 18, 2008, 10 pages.

Xiaohui Shi, A Method for Network Distance Prediction http://www.apng.org/9thcamp/Papers/Shi.pdf Last accessed on Nov. 18, 2008, 2 pages.

Ananth Rao, et al., Geographic Routing without Location Information http://delivery.acm.org/10.1145/940000/938996/p96-rao.pdf?key1=938996&key2=8568007221&coll=GUIDE&dl=GUIDE&CFID=11029802&CFTOKEN=80664012 Last accessed on Nov. 18, 2008, 13 pages.

Harsha V. Madhyastha, et al., A Structural Approach to Latency Prediction http://www.imconf.net/imc-2006/papers/p9-madhyastha.pdf Last accessed on Nov. 18, 2008, 6 pages.

Impact of BGP Dynamics on Intra-Domain Traffic. http://research.microsoft.com/~sagarwal/sigmetrics04.pdf.

David Anderson, et al., Resilient Overlay Networks http://nms.lcs.mit.edu/papers/ron-sosp2001.pdf. Last accessed on Nov. 20, 2008, 15 pages.

Manuel Costa, et al., PIC: Practical Internet Coordinates for Distance Estimation http://research.microsoft.com/~antr/MS/PIC-ICDCS.pdf. Last accessed on Nov. 20, 2008, 10 pages.

(Continued)

*Primary Examiner* — Jeffrey M Rutkowski
(74) *Attorney, Agent, or Firm* — Lee & Hayes, PLLC

(57) ABSTRACT

Systems and methods that improve predictions of network latency in network coordinate systems (NCS) based on combining Internet topology information therewith. Topology information can be incorporated into the NCS by system/methodologies represented by geographic bootstrapping; autonomous system (AS) correction; history prioritization; symmetric updates or a combination thereof. Such can improve latency estimation between nodes when using a virtual coordinate system based on latency measurements between nodes.

16 Claims, 11 Drawing Sheets

OTHER PUBLICATIONS

Frank Dabek, et al., Vivaldi:A Decentralized Network Coordinate System http://pdos.csail.mit.edu/papers/vivaldi:sigcomm/paper.pdf. Last accessed on Nov. 20, 2008, 12 pages.

Frank Dabek, et al., Designing a DHT for low latency and high throughput http://pdos.csail.mit.edu/papers/dhash:nsdi/paper.pdf. Last accessed on Nov. 20, 2008, 14 pages.

Marcel Dischinger, et al., Characterizing residential broadband networks. http://www.imconf.net/imc-2007/papers/imc137.pdf Last accessed on Nov. 20, 2008, 14 pages.

P. Francis, et al., A global Internet host distance estimation service http://idmaps.eecs.umich.edu/papers/ton01.pdf Last accessed on Nov. 20, 2008, 14 pages.

Michael J. Freedman, et al., Geographic locality of IP prefixes. http://www.usenix.org/event/imc05/tech/full_papers/freedman/freedman.pdf Last accessed on Nov. 20, 2008, 6 pages.

Michael J. Freedman, et al., OASIS: Anycast for any service. http://www.coralcdn.org/docs/oasis-nsdi06.pdf Last accessed on Nov. 20, 2008, 14 pages.

Saikat Guha, et al., Characterization and measurement of TCP traversal through NATs and firewalls. http://nutss.gforge.cis.cornell.edu/pub/imc05-tcpnat/ Last accessed on Nov. 20, 2008, 21 pages.

Ivan Herman, et al., Graph visualization and navigation in information visualization: a survey http://homepages.cwi.nl/~ivan/AboutMe/Publications/StarGraphVisulnInfoVis.pdf. Last accessed on Nov. 20, 2008, 21 pages.

Jonathan Ledlie, et al., Network coordinates in the wild http://www.eecs.harvard.edu/~syrah/nc/wild06-tr.pdf. Last accessed on Nov. 20, 2008, 14 pages.

Youngki Lee, et al., Measurement and estimation of network QoS among peer Xbox 360 game players http://icme2007.org/~padhye/publications/xbox08.pdf Last accessed on Nov. 20, 2008, 10 pages.

Cristian Lumezanu, et al., PeerWise discovery and negotiation of faster paths http://conferences.sigcomm.org/hotnets/2007/papers/hotnets6-final117.pdf Last accessed on Nov. 20, 2008, 6 pages.

Harsha V. Madhyastha, et al., iPlane: An information plane for distributed services. http://iplane.cs.washington.edu/osdi06.pdf Last accessed on Nov. 20, 2008, 14 pages.

Maxmind. Geolocation and online fraud prevention from Max-Mind http://www.maxmind.com/. Last accessed on Nov. 20, 2008, 1 page.

David Moore, et al., Where in the world is netgeo.caida.org? http://www.caida.org/publications/papers/2000/inet_netgeo/inet_netgeo.html Last accessed on Nov. 20, 2008, 14 pages.

Donald R. Morrison, Patricia—practical algorithm to retrieve information coded in alphanumeric. http://delivery.acm.org/10.1145/330000/321481/p514-morrison.pdf?key1=321481&key2=2761717221&coll=GUIDE&dl=GUIDE&CFID=11832998&CFTOKEN=86703012 Last accessed on Nov. 20, 2008, 21 pages.

T.S. Eugene Ng, et al., Predicting Internet network distance with coordinates-based approaches http://www.cs.rice.edu/~eugeneng/papers/INFOCOM02.pdf Last accessed on Nov. 20, 2008, 10 pages.

Venkata N. Padmanabhan, et al., An investigation of geographic mapping techniques for Internet hosts. http://research.microsoft.com/~padmanab/papers/sigcomm2001.pdf Last accessed on Nov. 20, 2008, 13 pages.

Marcelo Pias, et al., Lighthouses for scalable distributed location. http://research.microsoft.com/~tharris/papers/2003-iptps.pdf Last accessed on Nov. 20, 2008, 13 pages.

Ravi Prasad, et al., Effects of interrupt coalescence on network measurements. http://www.pam2004.org/papers/265.pdf Last accessed on Nov. 20, 2008, 10 pages.

Sylvia Ratnasamy, et al., Topologically-aware overlay construction and server selection. http://berkeley.intel-research.net/sylvia/infocom02.pdf Last accessed on Nov. 20, 2008, 10 pages.

Jennifer Rexford, et al., BGP routing stability of popular destinations http://www.cs.princeton.edu/~jrex/papers/imw02.pdf Last accessed on Nov. 20, 2008, 6 pages.

J. Rosenberg, et al., STUN—simple traversal of user datagram protocol (UDP) through network address translators (NATs) http://www.rfc-archive.org/getrfc.php?rfc=3489 Last accessed on Nov. 20, 2008, 34 pages.

Route Views Project. University of Oregon. http://www.routeviews.org/ Last accessed on Nov. 20, 2008, 5 pages.

Yuval Shavitt, et al., Big-Bang Simulation for embedding network distances in Euclidean space http://www.ieee-infocom.org/2003/papers/47_02.PDF Last accessed on Nov. 20, 2008, 11 pages.

Micah Sherr, et al., Veracity: A fully decentralized service for securing network coordinate systems. http://www.cs.toronto.edu/iptps2008/final/36.pdf Last accessed on Nov. 20, 2008, 6 pages.

Bernard Wong, et al., Meridian: A lightweight network location service without virtual coordinates. http://conferences.sigcomm.org/sigcomm/2005/paper-WonSli.pdf Last accessed on Nov. 20, 2008, 12 pages.

Golan Yona, et al., ProtoMap: automatic classification of protein sequences and hierarchy of protein families http://ai.stanford.edu/~serafim/CS374_2004/Papers/Yona_ProtoMap.pdf Last accessed on Nov. 20, 2008, 19 pages.

David John Zage, et al., On the accuracy of decentralized virtual coordinate systems in adversarial networks http://www.cs.purdue.edu/homes/zagedj/docs/ccs050-zage.pdf Last accessed on Nov. 20, 2008, 11 pages.

Han Zheng. et al., Internet routing policies and round-trip times http://www.pamconf.org/2005/PDF/34310241.pdf Last accessed on Nov. 20, 2008, 14 pages.

Gil Zigelman, et al., Texture mapping using surface flattening via multi-dimensional scaling. http://www.cs.technion.ac.il/users/wwwb/cgi-bin/tr-get.cgi/2000/CIS/CIS-2000-01.pdf Last accessed on Nov. 20, 2008, 9 pages.

* cited by examiner

NETWORK COORDINATE SYSTEMS USING IP INFORMATION

BACKGROUND

Technological advances in computer hardware, software, and networking have led to increased demand for electronic information exchange. Such electronic communication can provide split-second, reliable data transfer between essentially any two locations throughout the world. Many industries and consumers are leveraging such technology to improve efficiency and decrease cost through web-based (e.g., on-line) services.

For example, modern game-play devices have developed capabilities of powerful computers as more-advanced integrated circuit technology has become incorporated into such game-play devices. Additionally, gaming has progressed to an online arena, where players can connect their gaming systems with other players via an online server, and communicate, coordinate, and interface with other remote players while playing a game.

Within such online arenas, network communication falls into either a client-server architecture (i.e., users communicate with a large, well-provisioned, dedicated server) or a peer-to-peer (P2P) architecture (i.e., users communicate with each other directly or via a peer). Peer-to-peer architectures and networking environments have grown considerably in population and use. In a peer-to-peer environment, many applications require selection of another peer in a network that can provide services via a network connection, such as serving as the central coordinator for a multiplayer game. As such, one can refer to the peer that is searching for services as a "client" and to a potential peer that can provide these services as a "host." Additionally, in a peer-to-peer network there exist particular services, such as multiplayer game play, in which one or more "clients" connect to each other via a "host" intermediary, where both host and client are peers, rather than a dedicated, well-provisioned, centrally-located server. An individual peer can act as both a "host" and a "client" for different connections. In particular, effective selection or matchmaking of a client to a host based on network path quality (NPQ) can affect connectivity there between. Put differently, good network connectivity between a client and a matched host can enable optimal use of a peer-to-peer networking environment. NPQ can be any one or combination of attributes such as round trip time (RTT), upstream capacity, downstream capacity, one-way delays, etc.

Moreover, rapid estimation of round-trip time between machines remains critical for many distributed applications. In particular, content distribution systems need to find a best server for a content seeker. Likewise, distributed hash tables require selection of close machines for routing table entries and lookups. In multiplayer online games, players seek to cluster themselves so that players in the same session have low latency to each other. Similarly, users of Voice over Internet Protocol (VoIP) systems are highly sensitive to latency, and hence better server and peer selection can have a tremendous impact.

Two particular approaches to latency prediction are network coordinate systems (NCS) and Internet topology modeling. An NCS assigns each node a coordinate in a virtual metric space, such that the distance between two nodes' coordinates is a reasonable approximation of the round-trip time between them. Alternatively, the Internet topology modeling constructs a rough graph of the Internet so it can predict the latency between a given pair of nodes. Each of these approaches has limitations. An NCS constructs its world model purely based on distances observed between nodes and does not incorporate information about how the Internet is actually structured. The model thus winds up too loosely coupled to the reality of how the Internet works. Topology modeling, on the other hand, relies on a graph that takes effort to construct. It is thus typically incomplete (especially with respect to home machines) and it cannot rapidly evolve to reflect changes.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation improves prediction of network latency in network coordinate systems (NCS). It augments an NCS by employing geographic bootstrapping, autonomous system correction (AS), history prioritization, symmetric updates, or a combination thereof. NCSes use observations of latency measurements among a substantially large number of nodes to build virtual coordinates for mimicking the latency therebetween. Moreover, such virtual coordinates can be employed to determine what the latency between other nodes is likely to be. The subject innovation maintains existing advantages associated with the NCS, such as being amenable to de-centralized implementation systems, being responsive to changing Internet conditions, and being inclusive of measurements from all participating nodes.

In one aspect, geographic bootstrapping can represent initializing a node's virtual coordinate based on its approximate physical location (e.g., a geographical location on Earth, using techniques where distances between nodes can be used to approximate round trip time,) instead of at an arbitrary default origin point. Such an approach merges the benefits of NCS and geographic prediction and can produce a better result. Unlike a traditional NCS that begins with random initial conditions, the subject innovation initializes coordinates in approximately correct relative positions and so converges to a state with greater predictive power and higher confidence. Likewise, and unlike geographic prediction that produces static results, the subject innovation permits virtual node locations to vary dynamically based on round-trip time (RTT) observations. As such, the subject innovation can recover from errors in geographic location, adapt to changing network conditions, and handle nodes that diverge from typical models relating distance to latency.

In a related aspect, NCSes typically give each node an extra-dimensional coordinate referred to as its height. As such, it can model the component of latency due to having to traverse a path to a network core within the AS before proceeding toward any particular destination outside the AS. In the autonomous system (AS) correction technique, each node determines what AS it belongs to, and then can employ a formula to substantially increase the accuracy of its RTT predictions. Put differently, a network coordinate system typically assigns to each node an extra coordinate referred to as a height, which represents the overhead of reaching this node from the core of the Internet. The subject innovation can detect when both end points are in the same AS, and incorporate a predetermined formula to substantially increase accuracy of latency predictions.

Likewise, a further aspect of the subject innovation employs history prioritization to improve prediction of network latency in network coordinate systems (NCS). As such, using the network latency learned from prior probes between the same pair of nodes can produce superior results as compared to predictions based on coordinate distances between that pair of nodes.

A further aspect of the subject innovation is symmetric updates, which work as follows. When a node samples the RTT to another node, a typical NCS updates only the probing node's coordinates. The subject innovation updates coordinates of both nodes to substantially improve the predictive accuracy of the system. Such approach is readily applicable in systems that can afford a modest increase in network traffic and that have mutually trusting nodes. Put differently, in a network coordinate system, when a node probes another node, that other node can further update its own coordinates. Updating coordinates of both nodes substantially improves prediction accuracy.

In a related methodology, initially geographic location of nodes on earth can be determined (e.g., by looking up an IP address in a database and obtaining the associated geographic location). Subsequently, the location on the earth's surface in terms of latitude and longitude can be converted into a point in virtual 3-D space and translated into a 3-D coordinate. Such coordinates can then be employed in a networked coordinate system.

Likewise, for autonomous systems, initially for a node a determination is made regarding which autonomous system (AS) such node is located therein, (e.g., by determining who owns the node in a public registry). In one aspect, once two nodes have decided which AS they belong to, a subsequent determination is made as to whether such AS numbers are the same. If such numbers are not identical the methodology ends, and no further action is taken as the process is not applied thereto. Alternatively, if the numbers are identical the latency numbers can be modified between the two latency nodes, wherein a function of two heights (e.g., 20% of the total) can be subtracted from the latency estimate. Such an approach can mitigate inaccuracies resulting from overestimation of latencies within autonomous systems in the underlying coordinate system.

According to a further aspect, symmetry of the Internet can be exploited as an additional network topology feature. Consider a pair of nodes, node A (e.g., a sender node) and node B (e.g., a receiver node). Whenever node A measures a roundtrip to node B, it should subsequently notify B of the result so that both A and B can update their respective coordinates appropriately.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
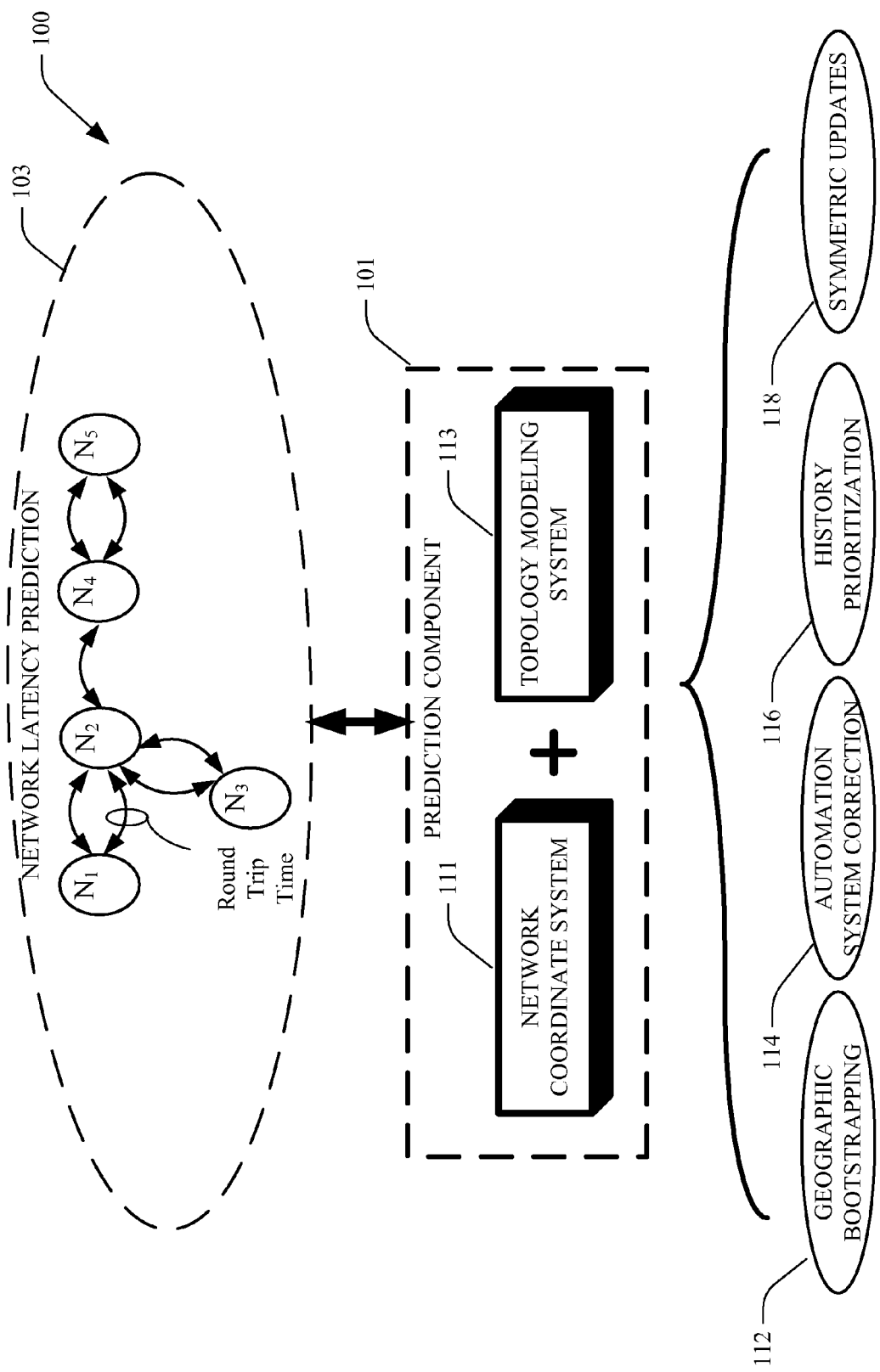
FIG. 1 illustrates a block diagram for network latency prediction according to an aspect of the subject innovation.

FIG. 1 illustrates a block diagram 100 for a prediction component 101 that predicts network latency according to an aspect of the subject innovation. Such prediction component 101 improves prediction in network latency of network coordinate system (NCS) 103 based on combining features of network topology 105 with the NCS 103. In particular, the prediction component 101 can employ one or more features/methodologies of: geographic bootstrapping 112; autonomous system correction (AS) 114; history prioritization 116; symmetric updates 118; or a combination thereof, as explained in detail below. As such, by exploiting and/or incorporating local IP information such as IP address into network coordinate systems, the latency between nodes can be better estimated.

The NCS 111 maintains the location of nodes in a virtual coordinate space. In a decentralized implementation, each node keeps track of the single location associated with itself. Moreover, by combining the topology modeling system 113 with the NCS 111, topology information can then be incorporated as part of such NCS 111. Furthermore, advantages associated with the NCS 111, such as being amenable to de-centralized implementation systems, being responsive to changing internet conditions, being inclusive of measurements from all participating nodes, and being adaptive, can be maintained.

As will be explained in more detail infra, the geographic bootstrapping feature 112 can represent initializing a node's virtual coordinate based on its approximate physical location (e.g., a geographical location on Earth) instead of employing an arbitrary default origin point. Such an approach merges the benefits of NCSes and geographic prediction and can produce better results. Unlike a traditional NCS, which begins with random initial conditions, the subject innovation initializes coordinates in approximately correct relative positions and so converges to a state with greater predictive power and higher confidence. Likewise, and unlike geographic prediction that produces static results, the subject innovation permits virtual node locations to vary dynamically based on round-trip time (RTT) observations. As such, the subject innovation can recover from errors in geographic location, adapt to changing network conditions, and handle nodes that diverge from the typical model relating distance to latency.

Similarly, the autonomous system correction 114 works as follows. An NCS typically gives each node an extra-dimensional coordinate referred to as its height. Such can model the component of latency due to having to traverse a path to a network core within the AS before proceeding toward any particular destination outside the AS. Moreover, if each node recognizes what AS it belongs to, it can employ a formula to substantially increase the accuracy of its RTT predictions.

Additionally, history prioritization 116 enables employing prior probes (e.g., older results) directly. Such can produce superior results as compared to predictions based on coordinate distances.

Likewise, in a network coordinate system, when a node probes another node, it can use the symmetric update feature 118, wherein it notifies the other node of the resulting RTT so that node can update its own coordinates. This can substantially improve prediction accuracy. As such, any one of the features 112, 114, 116, 118 enable the NCS 111 to incorporate topology information and make its model better represent the Internet—and thereby significantly improves its accuracy. In so doing, one nevertheless retains all the positive features of an NCS, namely that it is decentralized, scalable, inclusive, and adaptive.

Exemplary Conventional System

Figure 2:
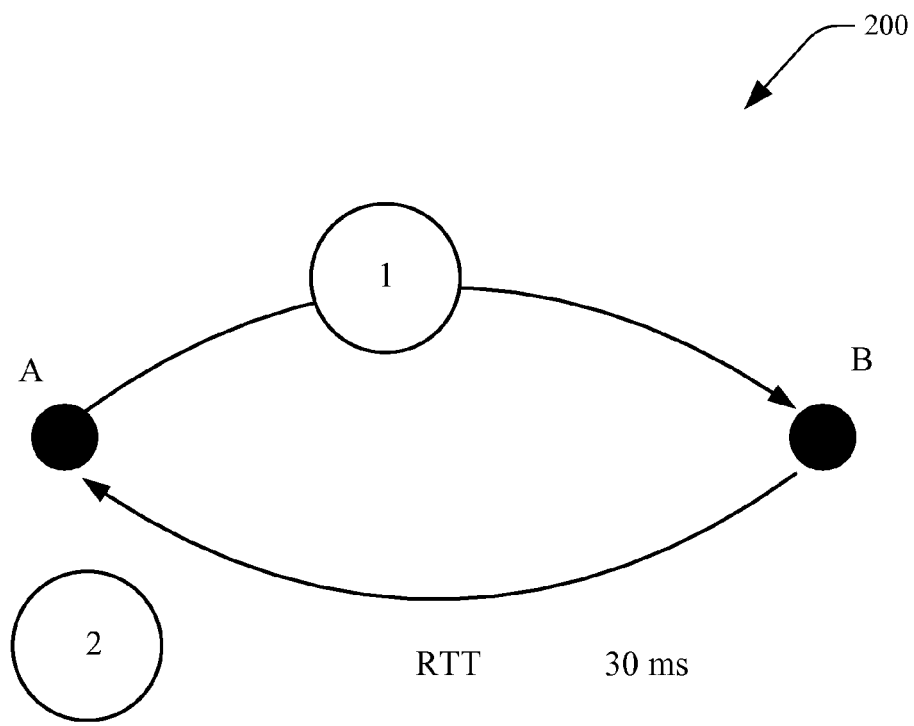
FIG. 2 illustrates a prior art system of latency prediction and update algorithm.
Figure 2:
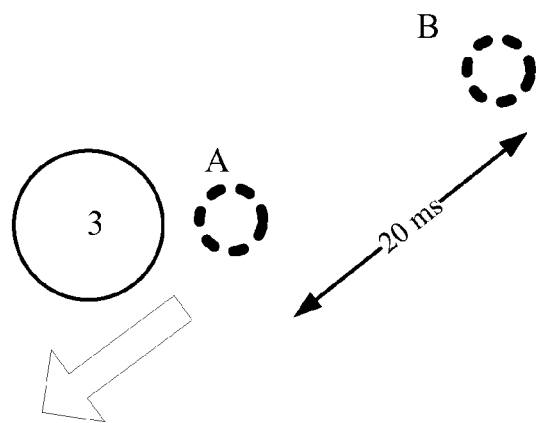

To provide a more accurate understanding of the subject innovation, FIG. 2 illustrates a conventional network coordinate system 200 referred to as Vivaldi. In general, Vivaldi represents an NCS, wherein each machine is assigned a coordinate in a virtual metric space, such that the distance between two machines' coordinates is a substantially reasonable approximation of the round-trip time between them. Each node can independently maintain its coordinates, updating them as appropriate whenever it observes a round-trip time to another node.

As illustrated in FIG. 2, during act (1) node A sends a message to node B. During act (2) node B responds, and node A measures the RTT. Then, in act (3), if the distance between their virtual coordinates is too low/high, node A applies a virtual force to its coordinate, moving it away from/toward B's. The conventional update algorithm associated with Vivaldi, includes $$w_s \leftarrow w_A/(w_A+w_B)$$

$$\epsilon \leftarrow \|\vec{x}_A - \vec{x}_B\| - l_{AB}/l_{AB}$$

$$w_s \leftarrow c_e w_s \epsilon (1 - c_e w_s) w_A$$

$$\vec{x}_A \leftarrow \vec{x}_A + c_c w_s \|\vec{x}_A - \vec{x}_B\| - l_{AB}) u(\vec{x}_B - \vec{x}_A)$$

run after node A learns the RTT $l_{AB}$ to node B. Here, $\vec{x}_N$ is the virtual location of node N, $w_N$ is the uncertainty of node N's coordinates, $u(\vec{y})$ is the unit vector in the direction of $\vec{y}$, and $c_c$ and $c_e$ are algorithmic constants.

Likewise, we can adapt the Vivaldi update algorithm to use spherical coordinates instead, by using the following formulas:

$$r \leftarrow 1 - c_e w_s ((\|\vec{x}_A - \vec{x}_B\| - l_{AB})/\|\vec{x}_A - \vec{x}_B\|$$

$$d \leftarrow \cos^{-1}[\cos(\phi_A)\cos(\phi_B) + \sin(\phi_A)\sin(\phi_B)\cos(\lambda_B - \lambda_A)] -$$

$$\gamma \leftarrow \tan^{-1}\left[\frac{\sin(\phi_B)\sin(\phi_A)\sin(\lambda_B - \lambda_A)}{\cos(\phi_A) - \cos(d)\cos(\phi_B)}\right]$$

$$\phi_A \leftarrow \cos^{-1}[\cos(rd)\cos(\phi_B) + \sin(rd)\sin(\phi_B)\cos(\gamma)]$$

$$\beta \leftarrow \tan^{-1}\left[\frac{\sin(\phi_B)\sin(rd)\sin(\gamma)}{\cos(rd) - \cos(\phi_A)\cos(\phi_B)}\right]$$

$$\lambda_A \leftarrow \lambda_B - \beta$$

Here, $\vec{x}_N$ represents the coordinates for node N, consisting of $\phi_N$ the latitudinal distance in radians between node N and the North Pole, and $\lambda_N$, the longitude in radians of node N. The formulas show how to compute r, the ratio between the desired and current distance between nodes A and B; d, the current distance in radians between them γ the angle from the North Pole to B to A (which remains the same as A moves); and β the angle from B to the North Pole to A's new location, for example.

In the conventional system initially Node A sends a message to node B, either as part of normal application traffic or for explicit coordinate maintenance. The time when the reply from node B arrives reveals the RTT to node A. If such RTT is different from the distance between the two nodes' virtual coordinates, node A updates its virtual coordinate accordingly. To do so, it applies a virtual force to its coordinate, either toward B's if the RTT was unexpectedly small or away from B's if it was unexpectedly large. In addition to its coordinates, each node also maintains an estimate of the uncertainty of these coordinates, which is a weighted moving average of the error observed between expected RTTs and observed RTTs. When coordinates improve such that distances better predict observed RTTs, uncertainty will decrease. Such uncertainty can be employed to determine how strong a force to apply is when updating coordinates; the greater node A's uncertainty the stronger the force will be, and the lower node B's uncertainty the stronger the force will be.

When a node joins the system, it initializes its coordinates to all zero, e.g., the origin, and its uncertainty to 100%. Due to a corner case in the equations described above, a node's initial coordinates can be "bumped" to random values in the range [0, 1).

Based on empirical research, Vivaldi's developers recommend using coordinates in a four-dimensional space, plus an extra non-Euclidean dimension known as the height. The distance between two coordinates with height h1 and h2 is the distance between their four-dimensional coordinates plus h1+h2. As such, the height represents the extra latency that a machine experiences on all its paths. Pyxida, an implementation of Vivaldi, incorporates other modifications to the basic algorithm based on experience with its real-world operation. For instance, to manage variability of individual RTT measurements, it keeps track of the last four latencies to each other node, and bases calculations on the 25th quantile of this sample. It also has the option to apply gravity, a small additional force that pulls coordinates gently toward the origin with each update, to combat systematic drift.

Geography Location

Figure 3:
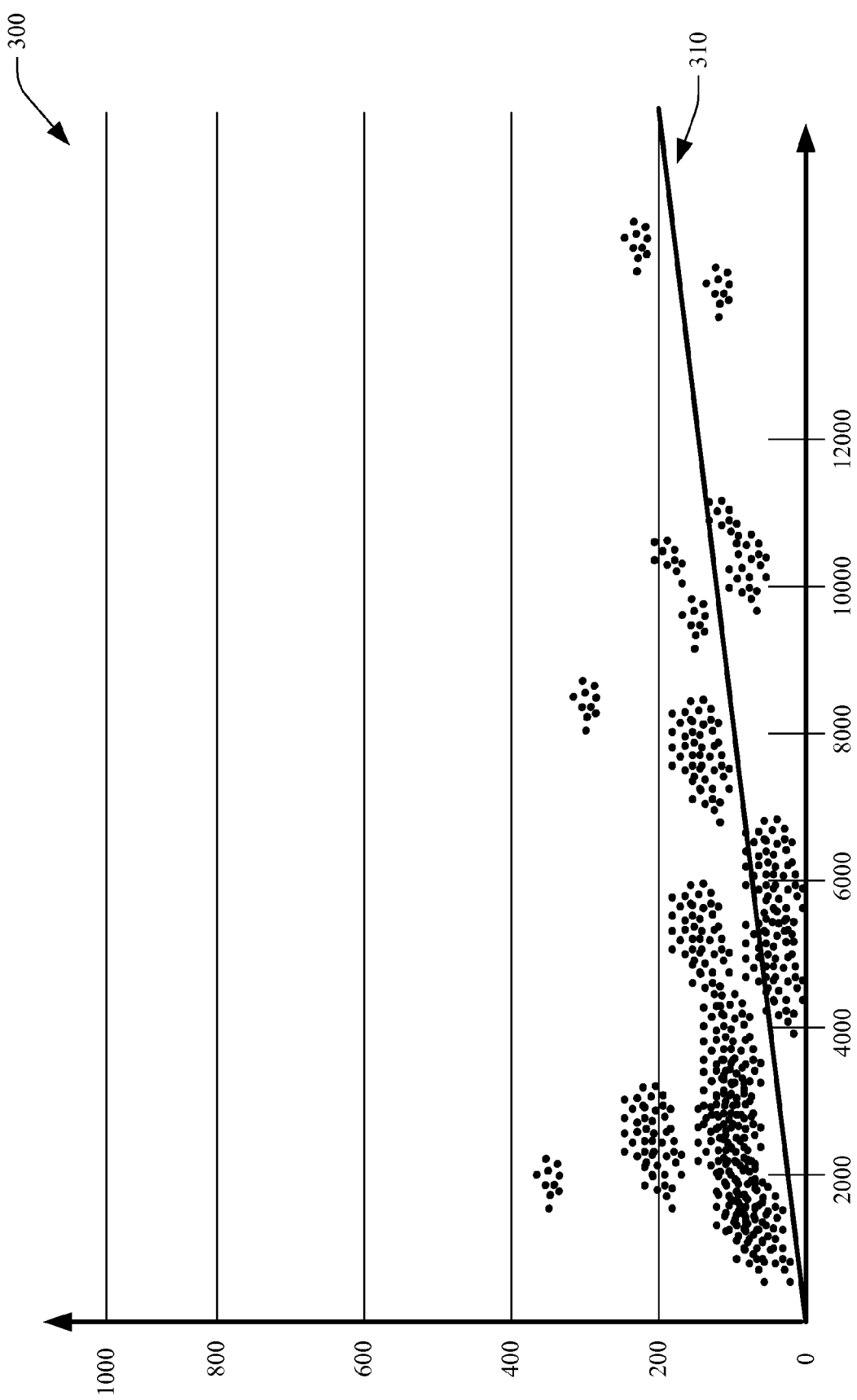
FIG. 3 illustrates an exemplary correlation between distances and round trip time.

One aspect of the subject innovation employs geography information, wherein it has been observed that the real-world great-circle distance between two physical machines represents a strong predictor of the RTT between them. For example, FIG. 3 illustrates a particular correlation between distance and RTT, wherein each point corresponds to one Xbox 360 console probing another.

As illustrated, each sample point corresponds to one Xbox 360 game console probing another; for ease of visibility, only a random 0.02% of probes in one day are shown. The solid line 310 in the figure shows the least squared-error regression fit to collected empirical data, which represents $$\text{Latency in ms} = \text{Distance in miles} \times 0.026 + 92;$$

wherein the Pearson correlation coefficient is 0.56. The factor of 0.026 ms/mile is about 4.8 times greater than the inverse speed of light. A factor of 2 is expected since once can employ round-trip latency, and the remaining factor of 2.4 suggests other causes besides the speed of light. The constant 92 ms suggests that each endpoint contributes an average latency of 46 ms on each of its paths beyond that predicted by distance.

It is to be appreciated that there exists a plurality of methods to estimate the latitude and longitude of a node for such kind of estimation. Examples include geographic databases, the Domain Name System, employing known geographic locations, and using Meridian to find which of them is closest to an address prefix and further assigning the geographic location of the closest infrastructure node to the prefix, mining websites, and the like.

Geographic Bootstrapping

Figure 4:
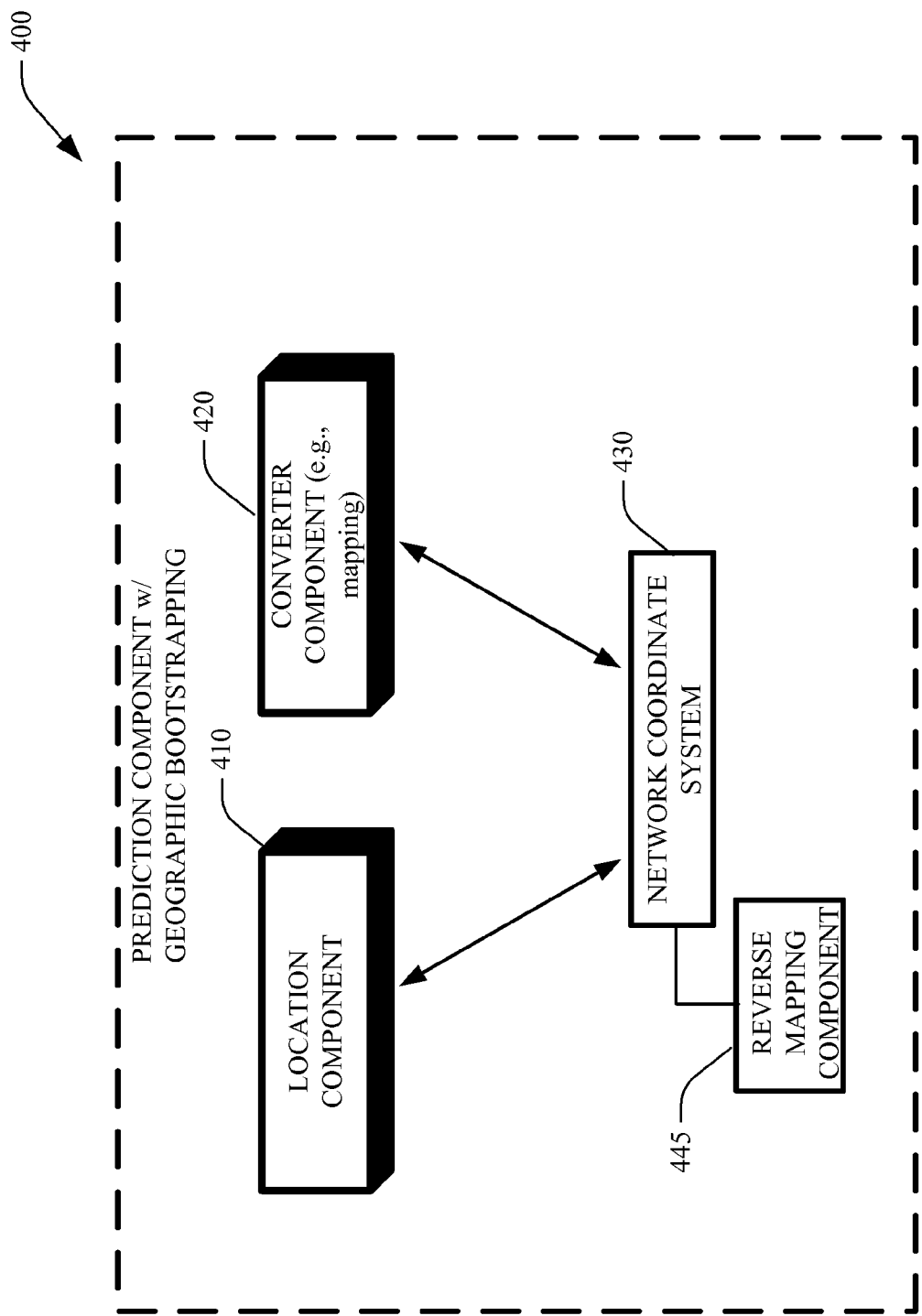
FIG. 4 illustrates a prediction component based on geographic bootstrapping according to an aspect of the subject innovation.

FIG. 4 illustrates an exemplary system 400 that employs geographic bootstrapping according to an aspect of the subject innovation. The system 400 includes a location component 410 that determines a geographic location for a node on Earth. A converter component 420 (e.g., mapping) can subsequently convert such location data into a point in virtual 3-D space and translate such data into a 3-D coordinate. Such coordinates can then be employed in a network coordinate system 430.

When a node joins the system, the location component 410 determines its geographic location by known methods. By making the initial locations of the nodes correspond to actual space, initial conditions can be improved compared to conventional systems such as Vivaldi. Moreover, by combining the two complementary approaches of network coordinates and geography, disadvantages of both approaches can be mitigated.

For example, a shortcoming of conventional systems that employs only geography is that physical distance represents a weak predictor of latency, as shown by the spread in FIG. 3 and the correlation coefficient of 0.56. Such correlation is particularly weak for low RTTs, which matter the most to some applications. Another concern with geography is that it is static, while network conditions can change and affect latency. Moreover, while some databases can map IP addresses to locations, none is complete and some entries are inaccurate.

Such problems are mitigated when the system 400 initializes NCS coordinates to correspond to the locations of the nodes in actual space. As explained earlier, the subject innovation improves Vivaldi because it provides better initial conditions.

The subject innovation improves on conventional geography systems by being robust to errors in geographic location. If a node's geographic location is inaccurate or missing, its coordinate can nevertheless be corrected based on the normal process of virtual coordinate refinement.

According to one particular aspect, instead of employing the great-circle distance as a metric for embedding geographic locations in a virtual coordinate space (for mapping to earth surface), the subject innovation employs the length of a straight-line chord running through the Earth and directly linking a node pair. Although this metric does not as closely match intuition as great-circle, it can provide substantially accurate results in practice. Its closest-fit linear regression is slightly different, and represented by $$\text{Latency in ms} = \text{Distance in miles} \times 0.031 + 85;$$

According to a further example, if the location of a node is unknown, it can initialize its coordinates to (0, 0, 0), corresponding to the center of the Earth, and its uncertainty to 100%. Otherwise, it initializes its coordinates using the formulas of $$r = \cos(\text{Lat} \times \pi/180) \times \text{Earth Radius}$$

$$x = \cos(\text{Lon} \times \pi/180) \times r$$

$$y = \sin(\text{Lon} \times \pi/180) \times r$$

$$z = \sin(\text{Lat} \times \pi/180) \times \text{EarthRadius}$$

wherein, Lat and Lon are the latitude and the longitude of the node with coordinate (x, y, z). A node also initializes its height to 42.5 ms, half the 85 ms of the regression, to reflect the expected contribution of this node to all paths involving it. The node then initializes its uncertainty to 40%, which represents an average error of the regression. After coordinate initialization, the standard Vivaldi algorithm can then proceed unchanged. It is to be appreciated that the invention is not so limited and such numbers are exemplary in nature.

As explained earlier, the geographic bootstrapping of the subject innovation merges the benefits of NCS and geographic prediction and produces a result that is more accurate than either. Unlike a traditional NCS, which begins with random initial conditions, the geographic bootstrapping of the subject innovation initializes coordinates in approximately correct relative positions and so converges to a state with greater predictive power. Moreover, and unlike geographic prediction, which produces static results, the subject innovation enables virtual node locations to vary dynamically based on latency observations. Thus, one can recover from errors in geographic location, adapt to changing network conditions, and manage nodes that diverge from the typical model relating geographic distance to latency.

As explained earlier, geographic bootstrapping requires that each machine determine its approximate real-world location. Typically, such can involve a centralized database mapping IP addresses to latitude and longitude values. Such requirement to employ a centralized component is limited to usage during node initialization. All further operations, including all latency predictions, are decentralized.

In a related aspect, in addition to predicting latencies, the system 400 can further be employed to increase accuracy for the geographic locations of nodes, via employing a reverse mapping component 445. As explained earlier, the subject innovation leverages the fact that there exists a correlation between geographic locations of nodes and their latency measurements. The virtual coordinate space, which represents latencies, is periodically updated/modified based on latency measurements—and hence by translating such coordinates back to their respective geographical locations, accuracy of the geographical locations can be improved.

Autonomous System Correction

In a related aspect, the Autonomous System (AS) correction methodology/system of the subject innovation can be based on the architecture of typical autonomous systems (ASes) that provide broadband access to machines on the Internet. In general, conventional systems like Vivaldi, augment Euclidean coordinates with height. Such height models latency between a machine and a high-speed Internet core while the distance between two Euclidean coordinates models the latency between two cores. One can loosely consider the latency that height represents to have two main components. First, a packet incurs latency in the so called "last-mile." In the case of a machine with a broadband DSL connection, this is the latency between the machine and the next IP-level device, such as the broadband remote access server (BRAS). The second component is the remaining latency to the high-speed network core for the AS the machine resides in. Typically, such can be a set of core routers where that AS peers with other ASes to reach the majority of machines on the Internet.

Figure 5:
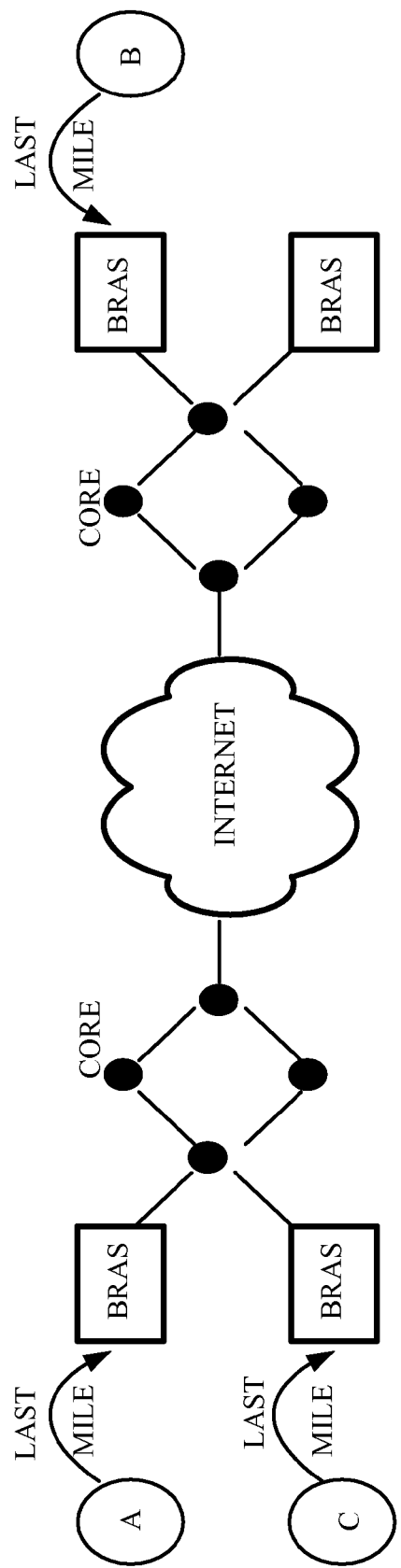
FIG. 5 illustrates a simple model of two autonomous systems (AS) with broadband machines on the Internet.

As depicted in FIG. 5, for a node A to reach node B, where the nodes are in different ASes, packets from A would have to traverse the last-mile, reach the core, traverse inter-AS links to the second core, reach the last-mile, and finally traverse the last-mile for B. However, a packet from A to node C in the same AS, after traversing A's last-mile, will use shortest path routing such as Open Shortest Path First (OSPF) or Intermediate System to Intermediate System (IS-IS) to obtain to the other end of C's last-mile and then traverse such last-mile. It will thus skip much of the second component of the height. This is typically the case for small regional ISPs where A and C are "close-by" in the network. However, if A and C are part of a single large AS that provides broadband access across the U.S., for example, and they are in distant locations, then a packet from A to C can traverse network cores to travel long-distance links to reach C. Accordingly, any height correction can typically be carefully applied by considering the locations of the two nodes in question.

In general, it is difficult to break a height down into its two components based solely on end-to-end RTT measurements. In one aspect, one can find the node in the AS with the minimum height, and assume that this height corresponds to the second component for all nodes in that AS. However, in a distributed NCS, it is difficult to obtain this value without some centralized component per AS. Simple approximations can further be implemented, which are amenable to distributed computation yet still notably improves intra-AS predictions. When predicting the RTT between two nodes in the same AS, one can simply ignore 20% of the height of each node.

As explained earlier, for node A to reach node B in FIG. 5, packets would traverse the last-mile, reach the core, traverse inter-AS links to the second core, and then traverse the last-mile. However, a packet from A to C will traverse a shorter path that skips some of the second component of the height. Such can occur when two nodes are part of the same AS and are "close-by" in the network. Using Border Gateway Protocol (BGP) routing tables, one can determine if two nodes belong to the same AS, and using geolocation their physical distance can be determined. Given that it can be difficult to break a height down into its two components based solely on end-to-end RTT measurements, one can rely on a heuristic, wherein one can ignore a portion of the sum of heights when predicting RTT or updating coordinates when nodes are within the same AS and not substantially far away from each other.

Figure 6:
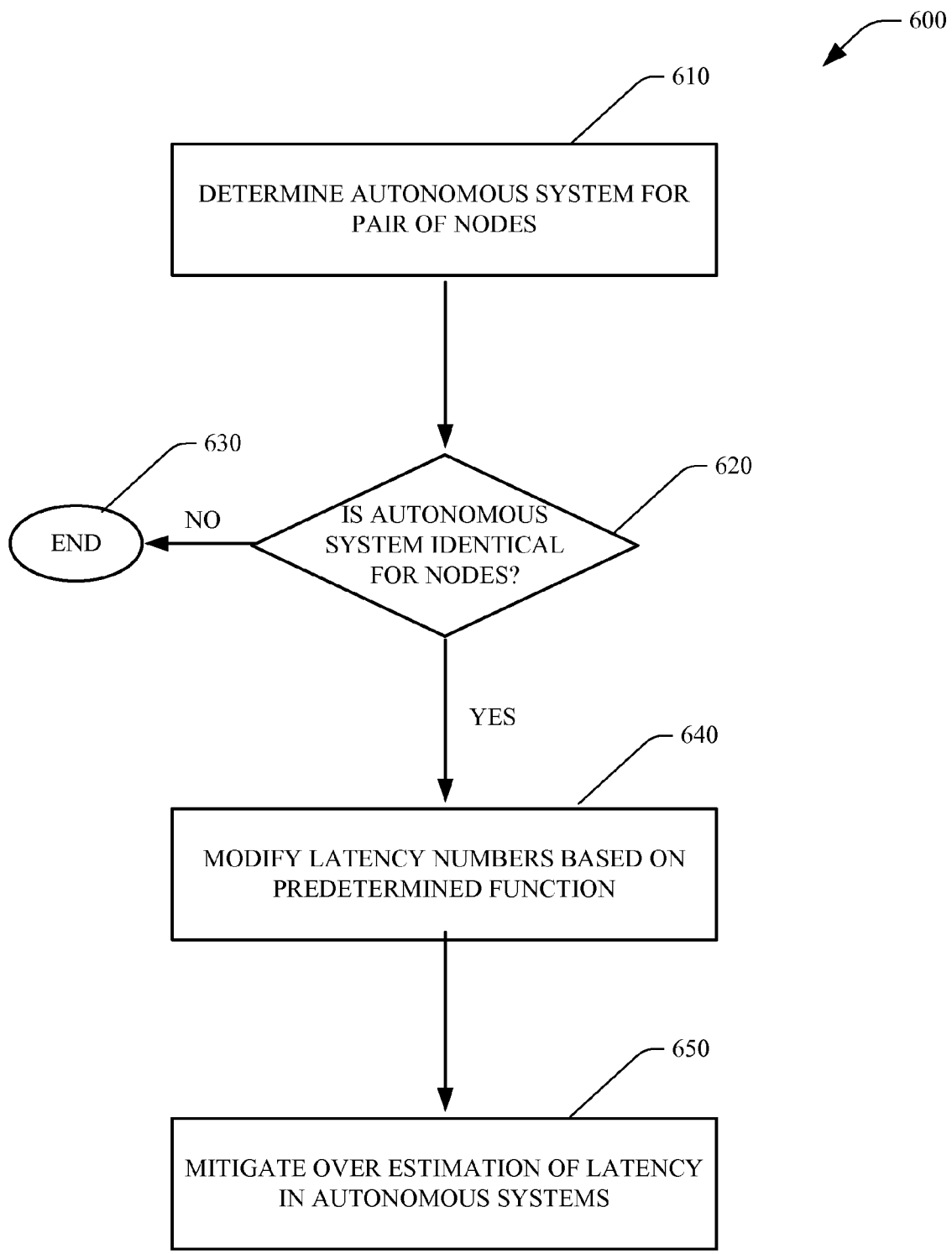
FIG. 6 illustrates a related methodology for AS correction when combining topology modeling with a network coordinate system, in accordance with an aspect of the subject innovation.

FIG. 6 illustrates a related methodology 600 for Autonomous System (AS) correction when combining topology modeling with a network coordinate system, in accordance with an aspect of the subject innovation. While the exemplary method is illustrated and described herein as a series of blocks representative of various events and/or acts, the subject innovation is not limited autonomous system for a pair of nodes is determined. Subsequently and by the illustrated ordering of such blocks. For instance, some acts or events may occur in different orders and/or concurrently with other acts or events, apart from the ordering illustrated herein, in accordance with the innovation. In addition, not all illustrated blocks, events, or acts may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 610, at 620 a verification is performed to indicate whether the autonomous system is identical for such pair. If not, the methodology 600 halts at 630. Otherwise, the methodology proceeds to act 640, and the latency numbers can be modified between the two latency nodes—wherein a predetermined function of two heights (e.g., 20% of the total of the two heights) can be subtracted from the RTT estimate. Hence, inaccuracies resulting from overestimation of latencies in autonomous systems can be mitigated at 650.

Put differently, an NCS typically supplies each node an extra-dimensional coordinate called its height. Such models the component of latency due to having to traverse a path to the core of the Internet before proceeding toward any particular destination. As explained earlier, this model breaks down when two nodes are close enough topologically that their routes to each other avoid the core. The subject innovation indicates that if each node knows what AS it belongs to, a node can predict many cases in which the model will break down, namely when both endpoints have the same AS number. As such, it can apply a simple formula to substantially increase the accuracy of its latency predictions.

History Prioritization

Figure 7:
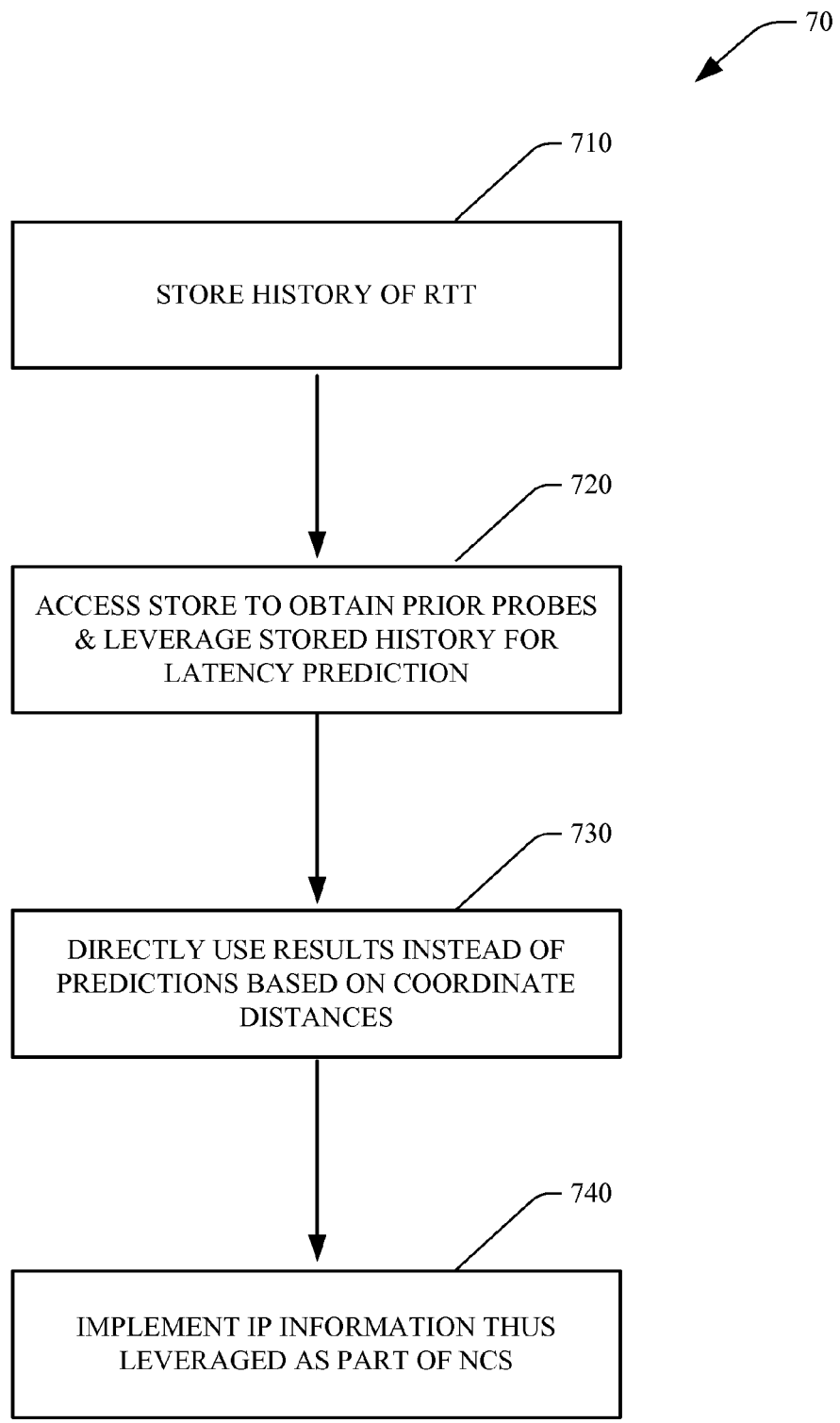
FIG. 7 illustrates a related methodology of leveraging IP address information for combining history prioritization with an NCS.

FIG. 7 illustrates a related methodology 700 of leveraging IP address information for combining with NCS via history prioritization. As such, employing prior probes (i.e., older results) directly can produce superior results as compared to predictions based on coordinate distances. As illustrated in FIG. 7, initially and at 710 a history of RTT observations can be stored in a storage medium. For example, such can include addresses already probed by nodes when obtaining latency prediction samples, and the RTTs observed to them. At 720, such storage medium can be accessed and the stored history leveraged for latency predictions. Subsequently and at 730 actual RTT data retrieved from the storage medium and prior probes can be directly used instead of predictions based on coordinate distances. As such, the methodology 700 combines history information into the NCS.

Put differently, a benefit of NCSes is that they are able to predict RTT between two nodes that have not previously measured RTT to each other. However, for the nodes that have measured RTT to each other, their coordinates are a reconciliation of these as well as other measurements to other nodes. Such can reduce the prediction accuracy for pairs of nodes with direct measurements. To remedy such shortcomings, the subject innovation employs history prioritization. As explained earlier, every time a Pyxida node learns the RTT to another node, it saves this RTT for use in variability smoothing. The subject innovation leverages such history, wherein when a prediction is required (if there exists a history for the destination node), one employs the most recently measured RTT instead of the RTT predicted by the coordinates. It is to be appreciated that the most recent RTT should be employed only if RTT measurements are robust, as can be done by taking the median of multiple probes. If they are not already made robust in this manner, one should use as the prediction the 25th quantile, or median, or some other quantile, of the most recent few observed RTTs.

The past RTT can be a good estimate of future RTT because RTTs on the Internet can be very stable. Moreover, improvements to operating systems have resulted in highly optimized network stacks where the number of packet copies is minimal, interrupt coalescence does not kick in under most conditions due to low per-packet processing overheads, and accurate timestamps are available for timing packets. Even though routing instability can cause fluctuations, such routing instability does not induce substantial inaccuracies. Furthermore, by smoothing RTT over a small number of successive measurements, variations can be removed. For example for about 95% of nodes that measured RTT multiple times between themselves for as long as 50 days, the coefficient of variation in RTT is found to be under 0.2.

Symmetric Updates

Figure 8:
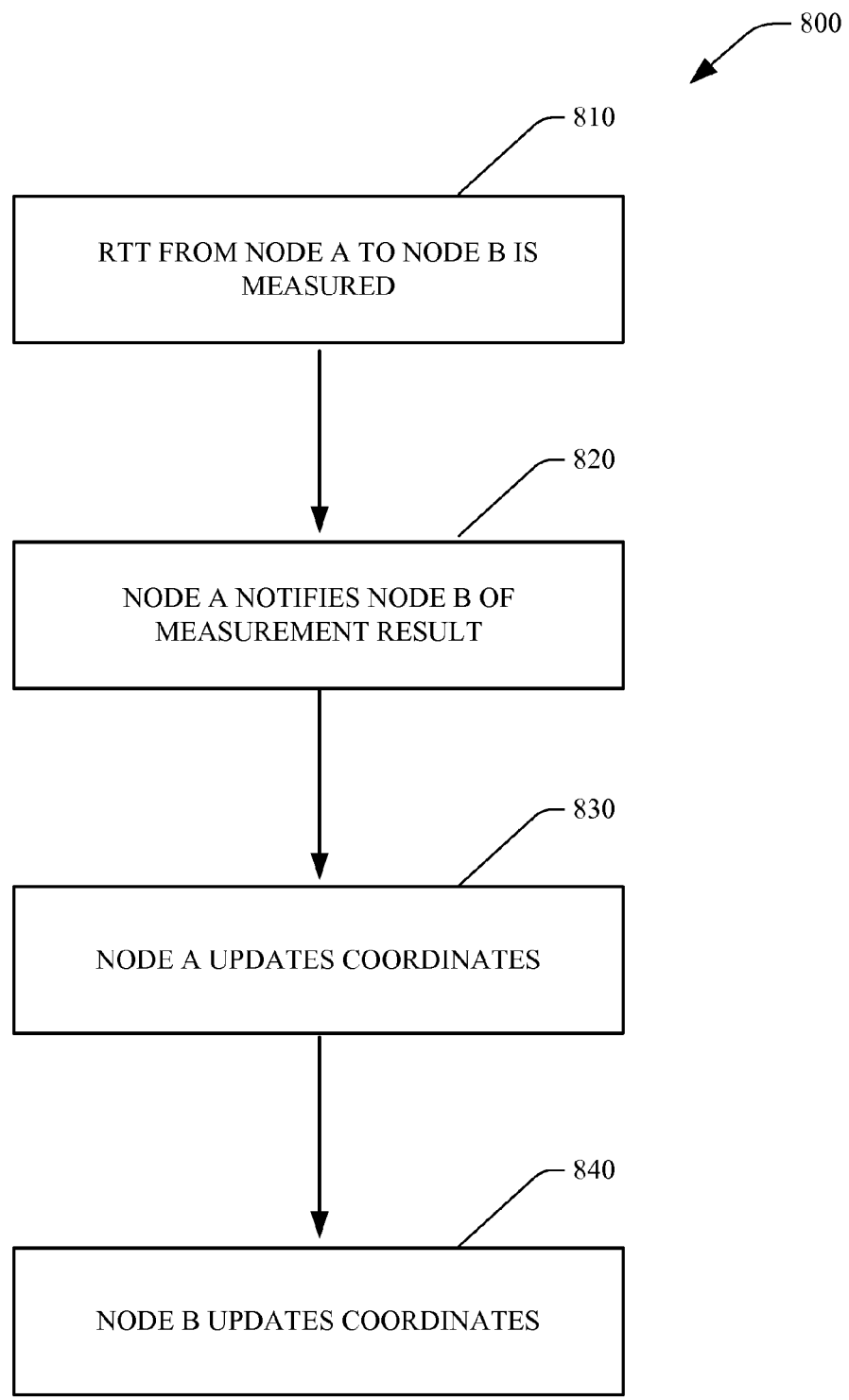
FIG. 8 illustrates a methodology of updating coordinates of both nodes according to an aspect of the subject innovation.

FIG. 8 illustrates a related aspect, wherein the subject innovation incorporates a decentralized technique of improving network coordinate systems, by implementing an update to coordinates of both nodes, as opposed to a typical NCS that updates only the probing node's coordinates, when a node samples the round-trip latency to another node. The methodology 800 initiates at 810, wherein node A (e.g., a sender node) measures RTT to node B (e.g., a receiver node). Subsequently, node A can notify node B of such measurement results—followed by node A updating its coordinates at 830. Thereafter, node B can update its coordinates at 840.

Put differently, the subject innovation exploits symmetry of RTTs in the Internet. Typically, the one-way latency from node A to node B can be different from B to A is because of asymmetric routing, and because of the non-synchronization of clocks associated therewith. However, RTT measurements do not suffer from such problems, as they cover the same links regardless of who initiates the measurement, and the same node measures the start and end times. Thus, the RTT from A to B is a highly effective predictor of the RTT from B to A. Furthermore, knowledge of such RTT is useful to both nodes in updating their coordinates to predict future latencies to other nodes. In conventional systems such as Pyxida's Vivaldi implementation, a node that measures the RTT to another node updates only its own coordinates.

However, since RTT is a symmetric measurement, it is just as useful to the other node for it to update its own coordinates. As such, the subject innovation implements a procedure, wherein after node A measures its RTT to another node B, it informs B of this result so that B can update its own coordinates as if B itself had done the measurement. Such can be referred to as symmetric updates.

Exemplary Aspects/Environments

Figure 9:
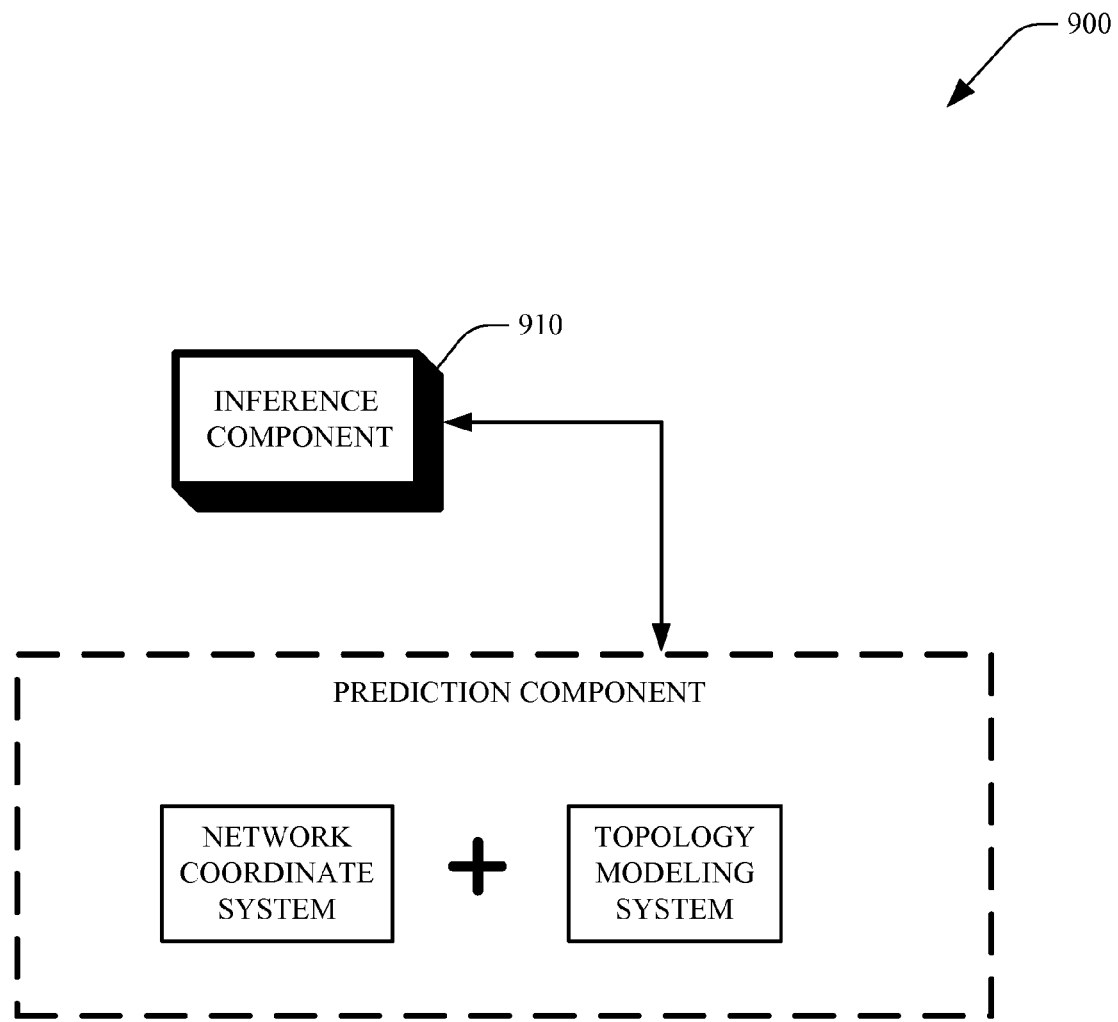
FIG. 9 illustrates an inference component that can facilitate combining topology information with an NCS according to an aspect of the subject innovation.

FIG. 9 illustrates a further aspect of the subject innovation that employs an inference component (e.g., for AS) to further facilitate combining local IP information into network coordinate systems. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The inference component 910 can employ any of a variety of suitable AI-based schemes as described supra in connection with facilitating various aspects of the herein described invention. For example, a process for learning explicitly or implicitly when to combine data related to the topology modeling system with an NCS, can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)$=confidence (class).

As used in herein, the terms "component," "system", "module" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 10:
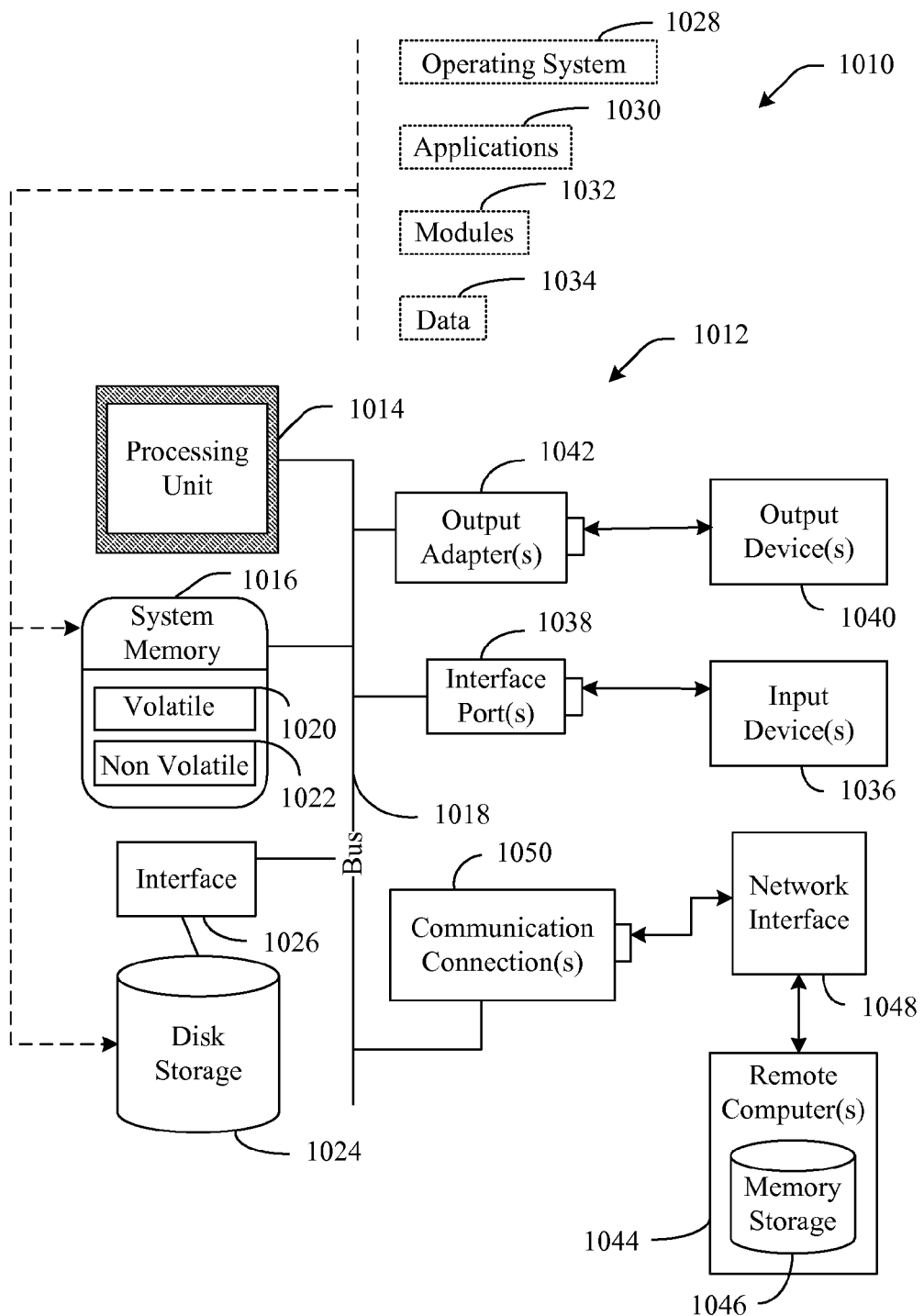
FIG. 10 is a schematic block diagram of a sample-computing environment that can be employed as part of combining network topology with an NCS in accordance with an aspect of the subject innovation.
Figure 11:
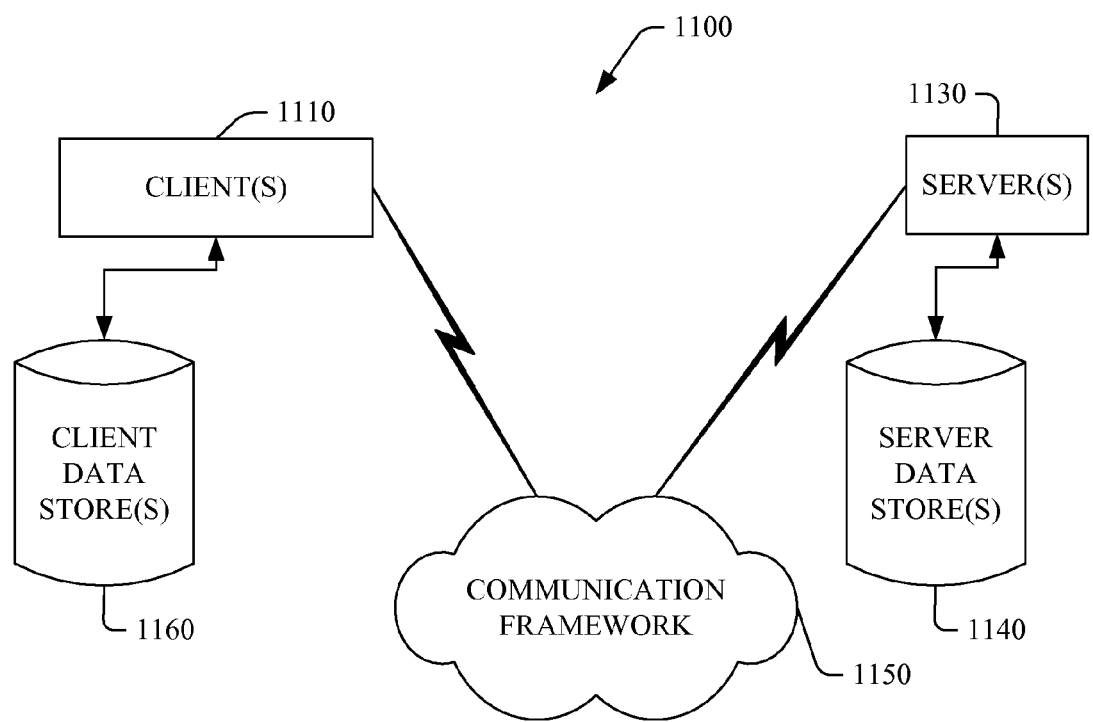
FIG. 11 illustrates an exemplary environment for implementing various aspects of the subject innovation.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 10, an exemplary environment 1010 for implementing various aspects of the subject innovation is described that includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/nonvolatile computer storage media. FIG. 10 illustrates a disk storage 1024, wherein such disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed as part of combining network topology information with NCS in accordance with an aspect of the subject innovation. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system comprising the following computer executable components:

a virtual coordinate space that maintains virtual locations of nodes associated therewith;

a prediction component that employs an automatic classification system to combine network topology information with the virtual coordinate space in a network coordinate system to predict network latency; and an autonomous system correction component that verifies closeness of nodes in the network topology and adjusts latency estimates for pairs of nodes that are in a same autonomous system.

2. The computer implemented system of claim 1, wherein the prediction component further comprises a location component that identifies geographic locations of nodes on Earth.

3. The computer implemented system of claim 2 further comprising a converter component that converts geographical location data to locations in the virtual coordinate space.

4. The computer implemented system of claim 1 wherein the prediction component prioritizes a prediction made using network latency learned from prior probes over a prediction made by coordinates.

5. The computer implemented system of claim 1, wherein information employed to update coordinates of a first node with respect to a second node is further employed to update coordinates of the second node with respect to the first node.

6. The computer implemented system of claim 1 further comprising an inference component that facilitates combination of network topology information with the network coordinate system (NCS).

7. A computer implemented method comprising the following computer executable acts:

employing an automatic classification system to perform acts comprising:

combining network topology information with a network coordinate system to represent the internet and predict latencies via a prediction component;

predicting the latencies based on the combining;

verifying whether nodes have identical autonomous systems; and mitigating inaccuracies resulting from overestimation of latencies between nodes in a same autonomous system by reducing estimated latency as a function of a height of two nodes.

8. The computer implemented method of claim 7 further comprising initializing a virtual coordinate for a node based on a physical location associated with the node.

9. The computer implemented method of claim 7 further comprising employing information from Border Gateway Protocol (BGP) to determine if two nodes belong to an identical AS.

10. The computer implemented method of claim 7 further comprising maintaining a history of prior probe results, for overriding latency predictions.

11. The computer implemented method of claim 7 further comprising exploiting symmetry of Internet for implementation as a network topology feature.

12. The computer implemented method of claim 7 further comprising determining reduction of estimated latency in part based on physical distance between nodes.

13. The computer implemented method of claim 8 further comprising measuring a round trip time (RTT) from a first node to a second node and sending the RTT to the second node.

14. The computer implemented method of claim 13 further comprising updating at least one of a coordinate and a history of the second node.

15. The computer implemented method of claim 8 further comprising inferring latency estimates via an AI component.

16. A computer implemented system comprising the following computer executable components:
- a virtual coordinate space to maintain virtual locations of nodes within a virtual coordinate space;
- a reverse mapping component to reverse map virtual coordinates of nodes to geographic locations thereof;
- a prediction component to predict latencies among the nodes based on combining network topology information with a network coordinate system (NCS) via an automatic classification system; and
- an autonomous system correction component that verifies closeness of nodes in the network topology and adjusts latency estimates for pairs of the nodes in a same autonomous system.

* * * * *